United States Patent
Yonesato et al.

(10) Patent No.: US 9,849,619 B2
(45) Date of Patent: Dec. 26, 2017

(54) APPARATUS FOR CORRECTING THE BENDING OF A MOLTEN RESIN AND METHOD OF CORRECTING THE BENDING OF THE MOLTEN RESIN

(75) Inventors: Jun Yonesato, Yokohama (JP); Taketoshi Manou, Yokohama (JP)

(73) Assignee: TOYO SEIKAN KAISHA, LTD., Tokyo (JP)

( * ) Notice: Subject to any disclaimer, the term of this patent is extended or adjusted under 35 U.S.C. 154(b) by 469 days.

(21) Appl. No.: 13/884,184

(22) PCT Filed: Nov. 10, 2011

(86) PCT No.: PCT/JP2011/075905
§ 371 (c)(1),
(2), (4) Date: May 8, 2013

(87) PCT Pub. No.: WO2012/063891
PCT Pub. Date: May 18, 2012

(65) Prior Publication Data
US 2013/0221557 A1    Aug. 29, 2013

(30) Foreign Application Priority Data
Nov. 11, 2010 (JP) ................................. 2010-253076

(51) Int. Cl.
*B29C 47/92* (2006.01)
*B29C 43/08* (2006.01)
(Continued)

(52) U.S. Cl.
CPC .............. *B29C 47/92* (2013.01); *B29C 43/08* (2013.01); *B29C 43/34* (2013.01); *B29C 43/58* (2013.01);
(Continued)

(58) Field of Classification Search
CPC .... B29C 2043/3438; B29C 2043/3466; B29C 2043/5816; B29C 2043/5891;
(Continued)

(56) References Cited

FOREIGN PATENT DOCUMENTS

JP  59-212233 A  12/1984
JP  59-212234 A  12/1984
(Continued)

OTHER PUBLICATIONS

Machine translation of JP2004-202786 (Hereinafter referred to as Tsuda et al.) published Jul. 22, 2004.*
(Continued)

*Primary Examiner* — Robert J Grun
(74) *Attorney, Agent, or Firm* — Sughrue Mion, PLLC

(57) ABSTRACT

An apparatus (31) for correcting the bending of the molten resin includes a temperature-adjusting device (32) arranged surrounding an extrusion passage (12) for extruding the molten resin (8) of an extrusion die head (7) along the direction of extruding the molten resin (8), a measuring means (33) for measuring the horizontal position of the molten resin (8) extruded from an extrusion opening (20) of the extrusion passage (12), and a control means (34) for controlling the temperature-adjusting device (32) based on the results measured by the measuring means (33).

4 Claims, 6 Drawing Sheets

(51) Int. Cl.
  *B29C 43/34* (2006.01)
  *B29C 43/58* (2006.01)
  B29C 47/00 (2006.01)
  B29C 47/86 (2006.01)

(52) U.S. Cl.
  CPC ........ *B29C 47/864* (2013.01); *B29C 47/0016* (2013.01); *B29C 47/86* (2013.01); *B29C 2043/3438* (2013.01); *B29C 2043/3466* (2013.01); *B29C 2043/5816* (2013.01); *B29C 2043/5891* (2013.01); *B29C 2947/92076* (2013.01); *B29C 2947/92171* (2013.01); *B29C 2947/92209* (2013.01); *B29C 2947/92438* (2013.01); *B29C 2947/92571* (2013.01); *B29C 2947/92666* (2013.01); *B29C 2947/92704* (2013.01); *B29C 2947/92942* (2013.01)

(58) Field of Classification Search
  CPC ........... B29C 2947/92571; B29C 2947/92666; B29C 2947/92704; B29C 2947/92942; B29C 43/08; B29C 43/34; B29C 43/58; B29C 47/0016; B29C 47/8805; B29C 47/92
  See application file for complete search history.

(56) References Cited

FOREIGN PATENT DOCUMENTS

| | | |
|---|---|---|
| JP | 8-34047 A | 2/1996 |
| JP | 2003-80051 A | 3/2003 |
| JP | 2004-202786 A | 7/2004 |
| JP | 2005-297349 A | 10/2005 |
| JP | 2005-319667 A | 11/2005 |

OTHER PUBLICATIONS

Machine translation of JP08-034047 (1996).*
Machine translation of JP2005-319667 (2005).*
Machine Translation of JP 2004-202786.*
Communication dated May 16, 2017 issued by the European Patent Office in counterpart application No. 11839344.6.

* cited by examiner

Fig. 5
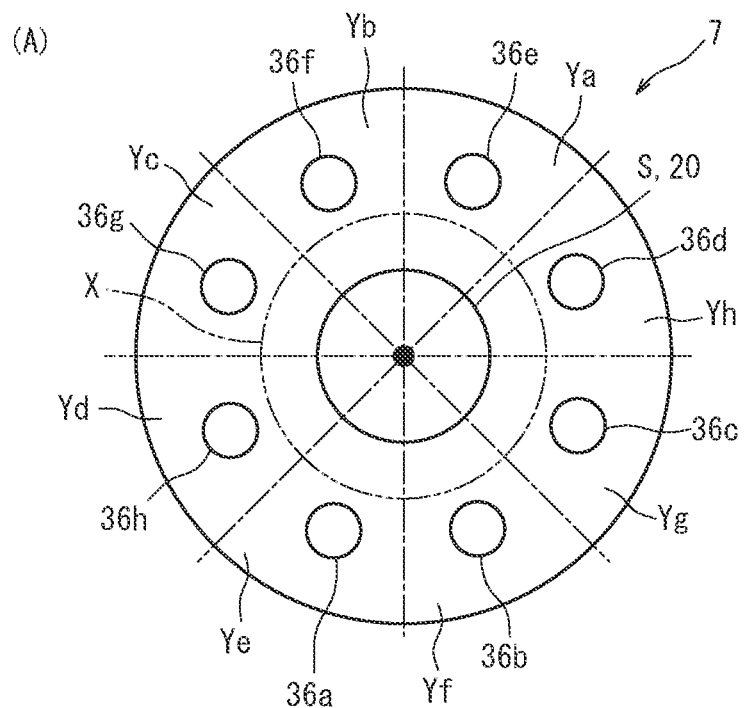
(A)
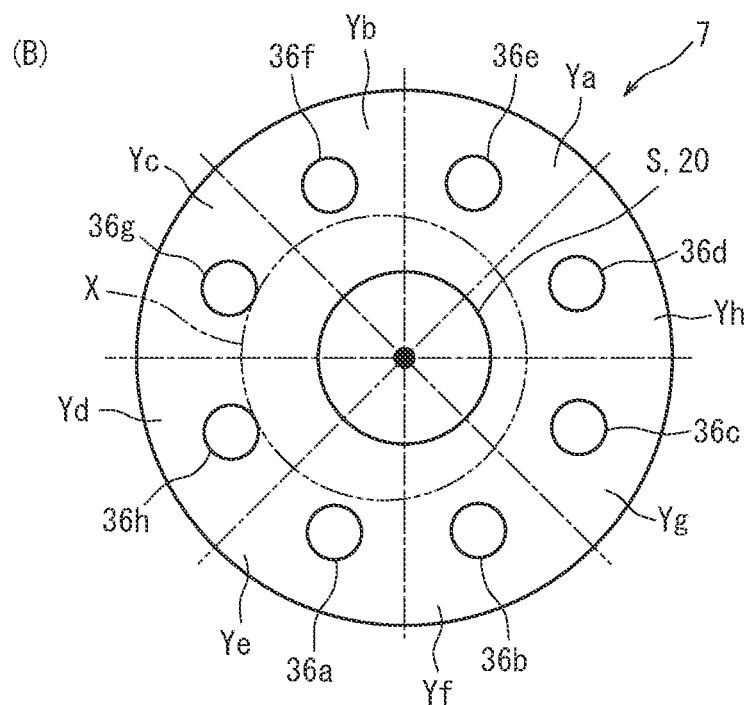
(B)

APPARATUS FOR CORRECTING THE BENDING OF A MOLTEN RESIN AND METHOD OF CORRECTING THE BENDING OF THE MOLTEN RESIN

CROSS REFERENCE TO RELATED APPLICATIONS

This application is a National Stage of International Application No. PCT/JP2011/075905, filed on Nov. 10, 2011, which claims priority from Japanese Patent Application No. 2010-253076, filed on Nov. 11, 2010, the contents of all of which are incorporated herein by reference in their entirety.

TECHNICAL FIELD

This invention relates to an apparatus for correcting the bending of a molten resin to correct the direction in which the molten resin is extruded from an extrusion die head and to a method of correcting the bending of the molten resin.

BACKGROUND ART

Synthetic resin containers of the shapes of bottles and cups formed by using synthetic resins such as polyethylene terephthalate and polyolefin, have now been widely put to practical use as containers for beverages and foods.

Such synthetic resin containers are obtained by injection-forming a synthetic resin such as polyethylene terephthalate or the like, or by forming a preformed article (usually called preform) by compression-forming a synthetic resin material in a molten state and, thereafter, biaxially stretch-blow-forming the preform. The containers can be further formed by blow-forming a hollow parison of a polyolefin such as polypropylene or polyethylene, or of a synthetic resin using, as an intermediate layer, a gas-barrier resin such as ethylene-vinyl alcohol, or by compression-forming a synthetic resin material in a molten state.

Here, in conducting the compression forming, the synthetic resin of a molten state (hereinafter called molten resin) is extruded from an extrusion opening formed in an extrusion die head mounted on an extrusion means, the extruded molten resin is cut from the extrusion opening and is transferred to a required position by a cutting mechanism and a holding mechanism that move across the extrusion opening, and is fed to a required portion in a compression metal mold. Here, to form a desired article, it is important that the molten resin cut by the cutting mechanism is correctly fed to the desired portion in the compression metal mold via the holding mechanism and, therefore, the molten resin must be extruded from the extrusion opening in a state of hanging down substantially vertically.

In extruding the molten resin, however, the molten resin extruded from the die head is often bent due to pressure and rate of extrusion, kind of the resin, structure of the extrusion passage in the die head and unevenness in the temperature of the molten resin. The molten resin that is cut and transferred in a bent manner cannot be correctly fed into the compression metal mold and makes it difficult to obtain the preform or the container as desired.

As a technology for correcting the bending of the molten resin, a patent document 1 discloses a correction method of correcting the bending of a resin in a molten state extruded from an extrusion opening formed in an end of an extrusion die head by inserting a resin flow control pin in a resin passage in the extrusion die head of an extruder, and by controlling the flow of the resin by adjusting the position of the resin flow control pin. At the time of adjustment according to the above correction method, the position of the molten resin flow control pin must be adjusted by hand while operating the extruder in a state where the molten resin mass no longer cut and is no longer transferred to the compression metal mold.

Further, a patent document 2 discloses a molten resin feeding apparatus equipped with a monitoring means capable of monitoring, from the lower side in the vertical direction, the extruded state of the molten resin extruded from the extrusion opening to fully accurately analyze the extruded state during the period of until the state of extruding the molten resin is stabilized without hindering the fall of the molten resin from the extrusion opening onto the holding means. The monitoring means includes an imaging means, and is moved away from the lower side of the opening in case of abnormal operation.

The above two documents, further, disclose the constitutions for cutting the molten resin extruded from the extrusion opening by a cutting mechanism to form a drop (material for compression forming) of a predetermined amount and for feeding the molten resin by inserting it in a dent of a female forming mold.

Further, a patent document 3 discloses an extrusion-forming method for controlling the thickness profile of the formed article to be constant by detecting the thickness profile of the formed article and by controlling the temperature distribution of an extrusion metal mold based on the detected results, wherein the extrusion metal mold constituted by a cylindrical outer die and an inner die is provided with a plurality of heating means and cooling means, and the individual heating means or the cooling means are separately controlled.

The method of the patent document 3 is to prevent the deviation in the thickness of the formed article at the time of extruding the cylindrical formed article or is to control the thickness of the formed article, and cannot be applied to the solid and molten resin to which the present invention is concerned.

PRIOR ART DOCUMENTS

Patent Documents

Patent document 1: JP-A-2005-319667
Patent document 2: JP-A-2005-297349
Patent document 3: JP-A-08-034047

OUTLINE OF THE INVENTION

Problems that the Invention is to Solve

According to the correction method described in the patent document 1, bending of the molten resin can be corrected by adjusting the position of the pin for controlling the flow of the molten resin. At the time of adjusting the position of the control pin, however, the adjustment must be done by operating the extruder in a state where the cutting of the molten resin mass is halted and the transfer thereof to the compression-forming machine is halted accompanied by a problem in that the molten resin extruded during the moment of adjusting the position of the control pin must be discarded negatively affecting the production efficiency and economy.

The correction method of the patent document 2 is to finely adjust the extrusion direction of the molten resin by tilting the molten resin extrusion nozzle in any direction when the molten resin generates bent. However, there are such problems that the apparatus becomes complex since means is necessary for driving the extrusion nozzle, and stability is not maintained in the extrusion direction of the molten resin.

The present invention was accomplished in view of the above-mentioned circumstances and has an object of providing an apparatus for correcting the bending of a molten resin, which corrects the direction in which the molten resin is extruded and is also capable of automatically correcting the bending of the molten resin even when the facility is in operation, and a method of correcting the bending of the molten resin.

Means for Solving the Problems

In order to achieve the above object, the apparatus for correcting the bending of a molten resin of the present invention comprises a temperature-adjusting device arranged surrounding a molten resin extrusion passage of an extrusion die head along the direction of extrusion, a measuring means for measuring the horizontal position of the molten resin extruded from an extrusion opening of the extrusion passage, and a control means for controlling the temperature-adjusting device based on the results measured by the measuring means.

In the apparatus for correcting the bending of the molten resin of the present invention, further, it is desired that:
1. The temperature-adjusting device includes a plurality of cooling passages which are independently controlled by the control means;
2. The measuring means includes an imaging means for picking up the image of an end portion of the molten resin, and a binary processing means for distinguishing the range of the end portion of the molten resin in the horizontal direction picked up by the imaging means from other ranges;
3. The measuring means comprises a plurality of laser displacement sensors for measuring the horizontal position of the molten resin on the outer circumferential end side thereof; and
4. The molten resin is cut by a cutting mechanism and is used as a molten resin mass of a predetermined amount for being compression-formed.

In order to achieve the above object, further, a method of correcting the bending of a molten resin of the present invention comprises controlling a temperature-adjusting device based on a measured horizontal position of the molten resin that is extruded, the temperature-adjusting device being arranged surrounding a molten resin extrusion passage of an extrusion die head along the direction of extrusion, and imparting a temperature difference to the molten resin flowing through the extrusion passage to adjust the direction in which the molten resin is extruded.

In the method of correcting the bending of the molten resin of the present invention, it is desired that the temperature-adjusting device includes a plurality of cooling passages which are independently controlled.

Effects of the Invention

According to the apparatus and the method for correcting the bending of a molten resin of the present invention, the temperature-adjusting device is controlled depending on a bent state of the molten resin extruded from the extrusion die head making it possible to correct the bending of the molten resin in real time and automatically without the need of halting the operation of the facility.

According to the apparatus and the method for correcting the bending of a molten resin of the present invention, further, it is allowed to arbitrarily bend the direction in which the molten resin is extruded.

BRIEF DESCRIPTION OF THE DRAWINGS

[FIG. 5] (A) is a reference view of the extrusion die head on the bottom surface side thereof showing an end surface of the molten resin extruded from the extrusion die head and a range of the normal region, and (B) is a reference view of the extrusion die head on the bottom surface side thereof of when the range of the normal region is deviated with respect to the center of the extrusion opening.

MODES FOR CARRYING OUT THE INVENTION

The constitution of the apparatus for correcting the bending of a molten resin and a method thereof according to a first embodiment of the invention will now be described with reference to the drawings.

Figure 1:
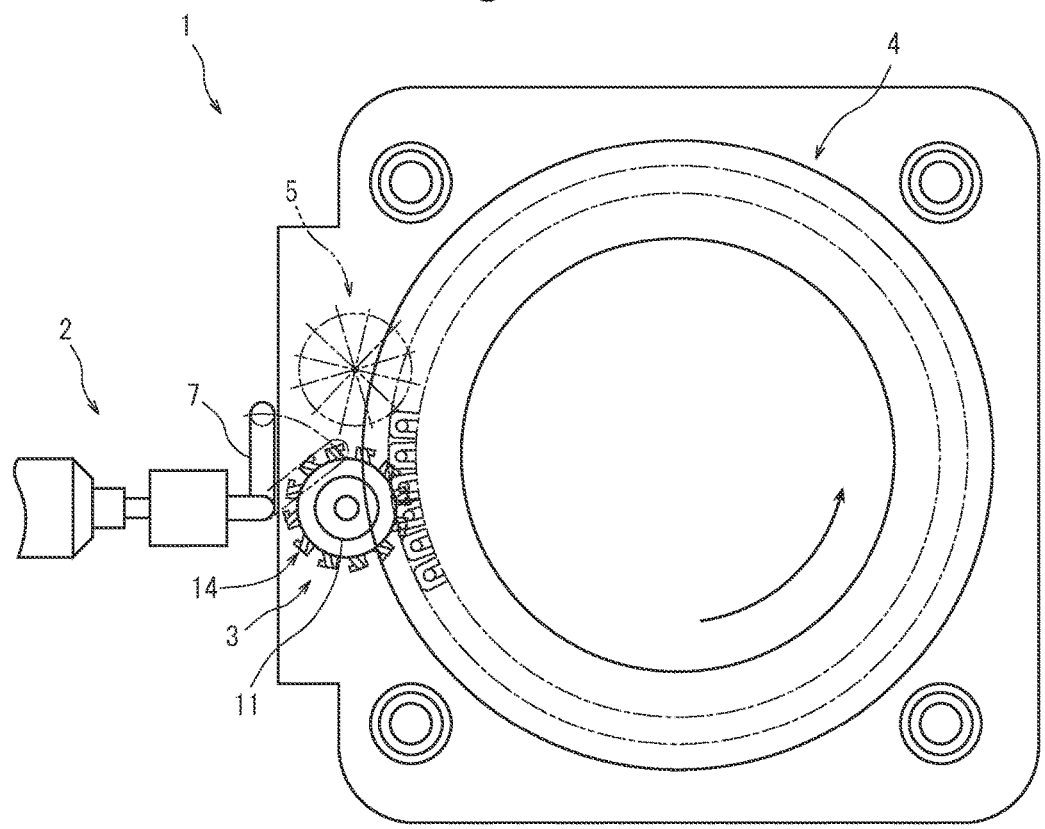
[FIG. 1] is a schematic plan view of a forming system equipped with an apparatus for correcting the bending of a molten resin according to a first embodiment of the present invention.
Figure 2:
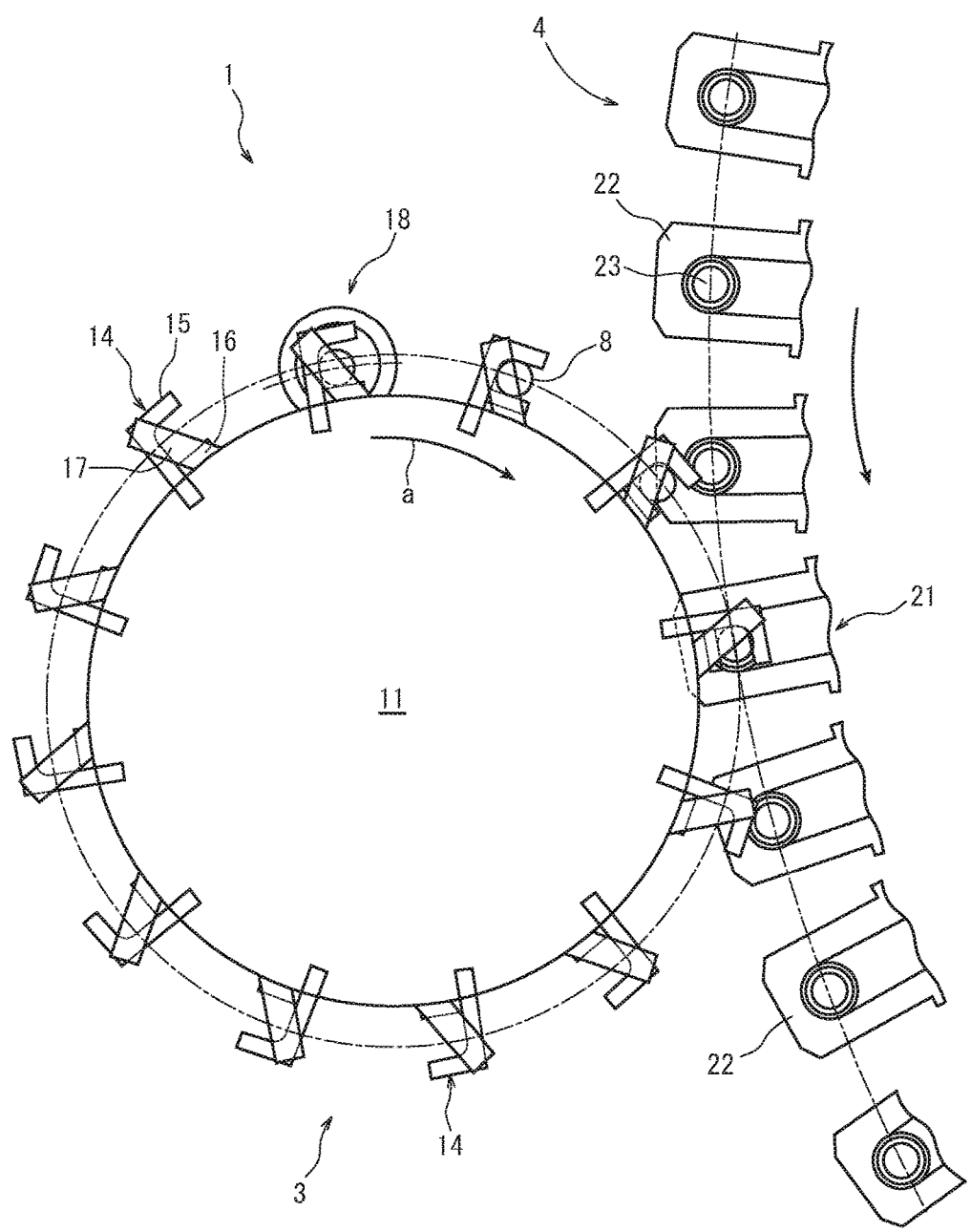
[FIG. 2] is an enlarged plan view of a part of the forming system of FIG. 1.
Figure 3:
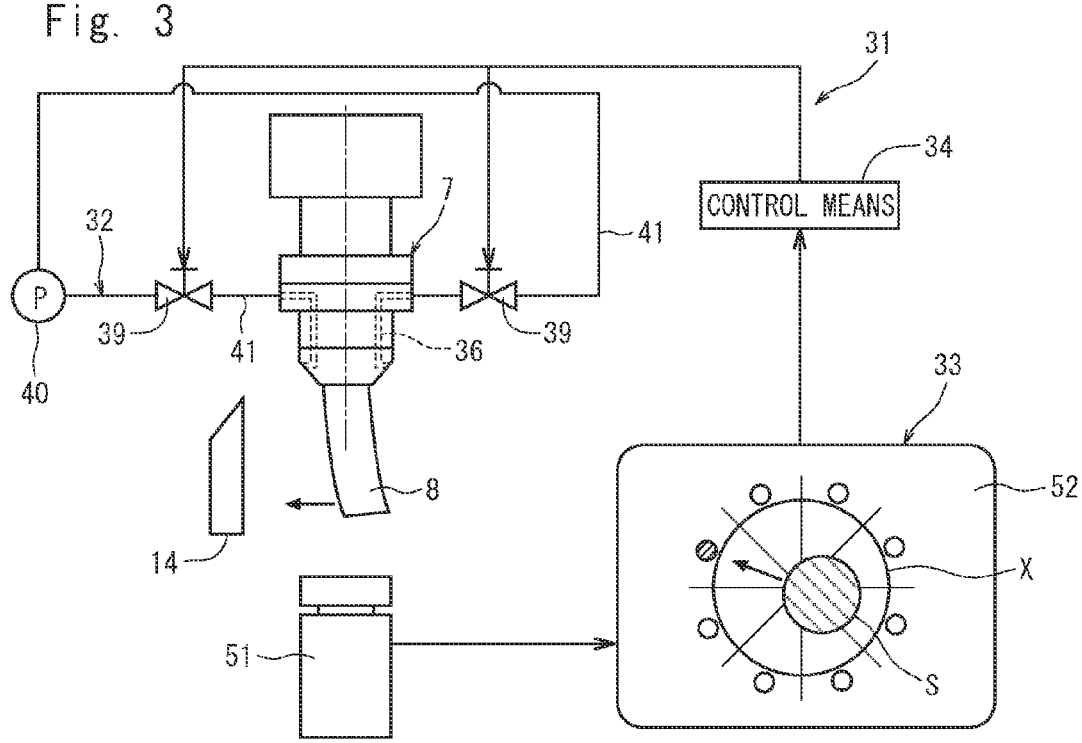
[FIG. 3] is a schematic drawing of the apparatus for correcting the bending of the molten resin according to the present invention.

FIG. 1 is a schematic plan view of a forming system 1 for carrying out the compression forming, FIG. 2 is an enlarged plan view of a part of the forming system of FIG. 1, and FIG. 3 is a schematic view of the apparatus for correcting the bending of the molten resin according to the present invention.

The forming system 1 includes an extruder 2, a synthetic resin feeder 3, a compression-forming apparatus 4 and a discharging apparatus 5, and is a forming system for forming the preformed articles (preforms) described above.

The extruder 2 has nearly a cylindrical outer shape, and heats, melts and kneads synthetic resin materials such as polyethylene terephthalate (PET) and the like to extrude a molten resin 8. The extruder 2 has an extrusion die head 7 on an end side thereof, the extrusion die head 7 being mounted to turn over a preset angle between a non-acting position separated away from the synthetic resin feeder 3 as represented by a solid line and an acting position on the side of the synthetic resin feeder 3 as represented by a two-dot chain line. An extrusion passage 12 is formed in the extrusion die head 7 to extend up to an extrusion opening 20 at an end thereof (see FIG. 4).

The extruder 2 continuously sends the molten resin 8 into the extrusion die head 7, and the molten resin 8 extruded from the extruder 2 is then extruded through the extrusion opening 20. When the forming system 1 is in operation, the extrusion die head 7 is disposed at the acting position on the side of the synthetic resin feeder 3 shown in FIG. 1.

If described with reference to FIGS. 1 and 2, the synthetic resin feeder 3 is provided with a rotary disk 11 that is driven to rotate in a direction indicated by an arrow a, the rotary disk 11 having a plurality of cutting/holding units 14 (cutting mechanisms and holding mechanisms) arranged along the circumferential edge thereof maintaining an equal distance in the circumferential direction. The cutting/holding unit 14 is conveyed along a circular conveyer path that extends along the circumferential edge of the rotary disk 11, i.e., conveyed to a receiving position 18 where it is positioned just under the extrusion opening 20 of the extrusion die head 7 facing thereto and to a resin feed position 21 where it faces one of a plurality of metal molds 22 comprising known male molds and female molds (not shown) of the compression-forming apparatus 4.

Each cutting/holding unit 14 includes a cutter 17, a first holding member 15 and a second holding member 16. The first holding member 15 and the second holding member 16 work in cooperation together to hold or release the molten resin 8.

The cutter 17 that cuts the molten resin 8 is extending in the transverse direction over the holding members 15 and 16, and the molten resin 8 extruded from the extrusion opening 20 of the extrusion die head 7 is received in a receiving space of the holding members 15 and 16 just before the cutting/holding unit 14 passes over the receiving position 18. In FIG. 3, the cutting/holding unit 14 is shown in a simplified manner.

The cutter 17 moves in a horizontal direction with its upper surface close to the lower surface of the extrusion die head 7, and cuts the molten resin 8 extruded from the extrusion opening 20 into a predetermined size. At a suitable moment after the cutter 17 has started cutting the molten resin 8, the molten resin 8 (molten resin mass) is held between the first holding member 15 and the second holding member 16.

When the cutting/holding unit 14 passes over a resin feed position 21, the second holding member 16 is moved to an open position where the molten resin mass is no longer held by the cooperative work of the first holding member 15 and the second holding member 16, and the molten resin 8 is fed to a required portion 23 of the metal mold 22.

Figure 4:
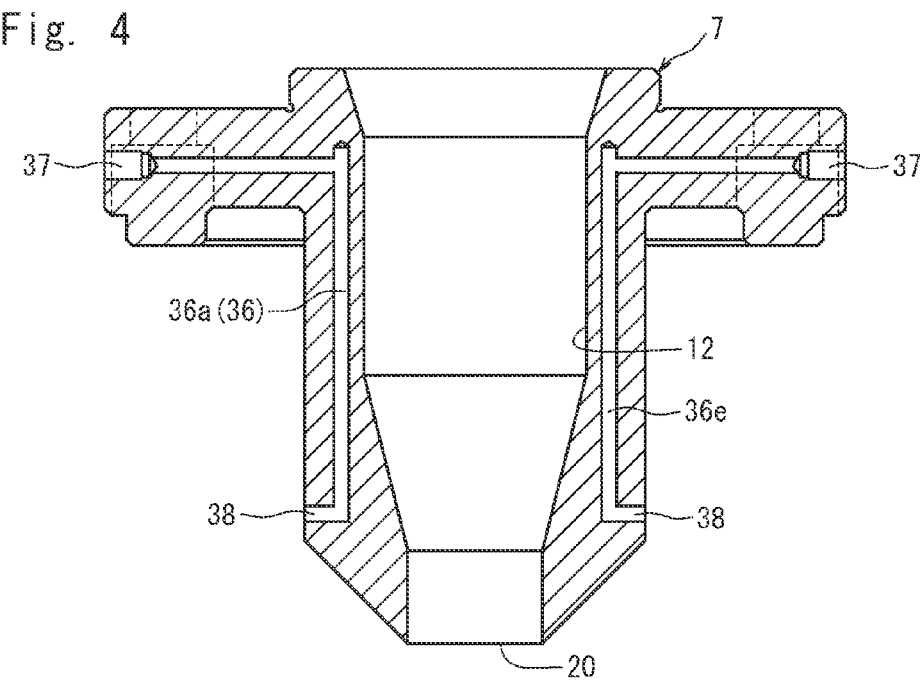
[FIG. 4] is an enlarged sectional view of an extrusion die head of an extruder shown in FIG. 2.

If described with reference to FIGS. 3 and 4, an apparatus 31 for correcting the bending of the molten resin (hereinafter referred to as bend correction apparatus) comprises a temperature-adjusting device 32 arranged surrounding the passage 12 for extruding the molten resin 8 of the extrusion die head 7 along the direction of extrusion, a measuring means 33 for measuring the horizontal position of the molten resin 8 extruded from the extrusion opening 20 of the extrusion passage 12, and a control means 34 for controlling the temperature-adjusting device 32 based on the result measured by the measuring means 33.

In this embodiment, the temperature-adjusting device 32 includes a plurality of cooling passages 36 arranged surrounding the extrusion passage 12 of the extrusion die head 7 along the direction of extrusion, a pump 40 for feeding a cooling medium, external passages 41 for connecting the plurality of cooling passages 36 to the pump 40, and opening/closing valves 39 provided in the external passages 41.

Referring to FIG. 5(A), eight cooling passages 36 of the same shape are arranged in the die head 7 maintaining an equal angular distance (45 degrees) in the circumferential direction thereof (the cooling passage 36 is a general term for the cooling passages 36a to 36h shown in FIG. 5A). The cooling passage 36 is formed so as to extend in a horizontal direction from a feed port 37 formed in an outer circumferential portion of the extrusion die head 7 toward the inside of the extrusion die head 7, extend downward in its way in parallel with the direction in which the molten resin 8 is extruded, and extend in a horizontal direction toward an exhaust port 38 formed in an outer circumferential portion of the extrusion die head 7 just before the lower end of the extrusion opening 20. Here, the exhaust port 38 is preferably provided at a position where the air, that is the cooling medium, will not affect the molten resin 8 being extruded.

The feed ports 37 of the plurality of cooling passages 36 are connected to the pump 40 through the external passages 41. The opening/closing valves 39 are independently disposed in the external passages 41 to open or shut off the external passages 41.

In this embodiment, further, though the air of normal temperature is used as the cooling medium that flows through the cooling passages 36, it is also allowable to use a gas other than the air or a liquid such as water. In this case, the cooling passages 36 may be constituted in a circulating manner. Or when use is made of a gas that cannot be released to the exterior, a recovery means may be provided.

Further, the temperature-adjusting device 32 may not be limited to the cooling passages 36 but may be the heating means. In this case, the temperature-adjusting device 32 may be suitably modified to use heaters or the like instead of using the cooling passages 36.

The measuring means 33 includes an imaging camera 51 that serves as an imaging means for picking up the image of the end portion of the molten resin, and a binary processing means 52 for identifying the range of the end portion of the molten resin in the horizontal direction picked up by the imaging camera 51 from other ranges.

The imaging camera 51 is disposed just under the extrusion die head 7 maintaining a gap through which the cutting/holding unit 19 passes, and picks up the image of the end portion S (lower surface) of the molten resin 8 extruded from the extrusion opening 20 of the extrusion die head 7. The image picked up by the imaging camera 51 is output to the binary processing means 52 that identifies the image of the end portion S of the molten resin 8 and other portions and puts them to the binary processing. For example, the molten resin 8 is identified by rendering the image of the end portion S of the molten resin 8 to be white and other portions to be black.

From the binary processed image input from the binary processing means 52 as shown in FIG. 5(A), the control means 34 sets a normal region (inside a circle of a dot-dash chain line) X which is a range in which the molten resin 8 is permitted to bend and a correction region Y on the outer side of the normal region X, so as to grasp a pixel color for each coordinate of pixel of the binary processed image to thereby identify, for instance, the state of pixels such as the number of pixels of an amount the end portion S has entered into the correction region Y.

The control means 34 judges that the bending of the molten resin 8 is within the normal range if the end portion S is all within the normal region X, and works to correct the molten resin 8 if even a part of the end portion S is outside the normal region X (in the correction region Y).

Here, though the normal region X is the one region, the correction region Y has been divided into eight sections Ya to Yh (i.e., the correction region Y is a general term for the correction regions Ya to Yh) at an angular distance of 45 degrees in the circumferential direction to meet the arrangement of the cooling passages 36 that will be described later.

Figure 6:
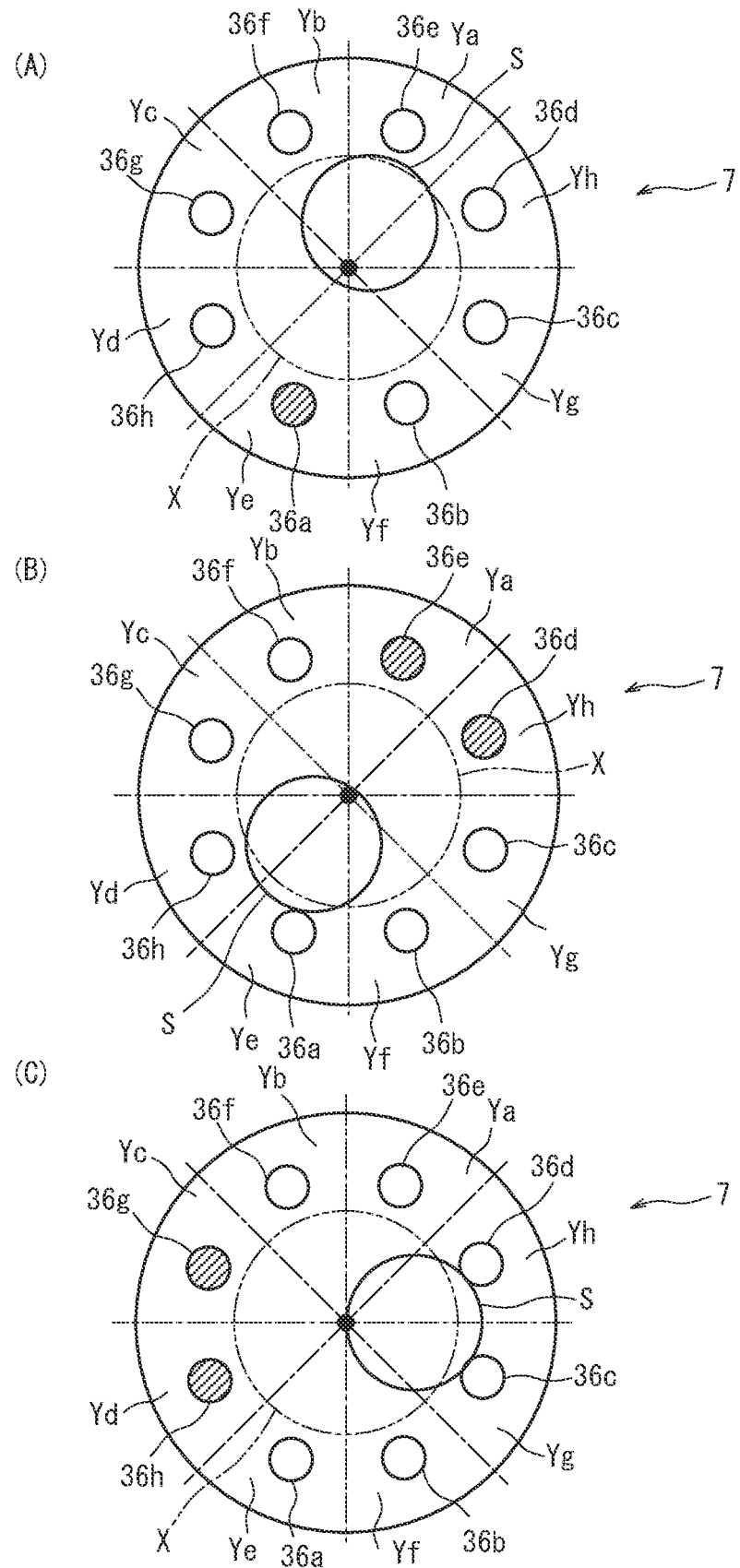
[FIG. 6] (A) is a reference view of the die head on the bottom surface side thereof in a state where the end surface of the molten resin has entered into one of the eight correction regions, (B) is a reference view of the die head on the bottom surface side thereof in a state where the end surface of the molten resin has entered into two correction regions, and (C) is a reference view of the die head on the bottom surface side thereof in a state where the end surface of the molten resin has entered into two correction regions at an equal ratio.

The control means 34 works to open the cooling passage 36 of the side opposite to the side on where the molten resin 8 has deflected into the correction region Y. Referring, for example, to FIG. 6(A), if the end portion S enters into the correction region Ya, the opening/closing valve 39 opens in the external passage 41 connected to the cooling passage 36a opposite to the correction region Ya, and the air flows into the cooling passage 36a. Referring to FIG. 6(B), if the end portion S enters into two correction regions Yd and Ye, the opening/closing valves 39 open in the external passages 41 connected to the cooling passages 36d and 36e opposite to the correction regions Yd and Ye, and the air flows into the cooling passages 36d and 36e. Referring to FIG. 6(C) further, if the end portion S enters into the correction regions Yg and Yh, the opening/closing valves 39 open in the external passages 41 connected to the cooling passages 36g and 36h opposite to the correction regions Yg and Yh, and the air flows into the cooling passages 36g and 36h.

Further, if the end portion S returns from any one of the correction regions Y back to the normal region X, the corresponding opening/closing valve 39 is closed and the air stops to flow into the cooling passage 36. Further, if the whole end portion S is within the normal region X, the opening/closing valves 39 all remain closed, and the air flows stops to flow into all of the cooling passages 36. Here, the opening/closing valves 39 are opened and closed by electric signals and independently work to control the above plurality of (eight) cooling passages 36.

Next, the action of the embodiment will be described.

Being constituted as described above, the extruder 2 heats, melts and kneads the synthetic resin materials such as polyethylene terephthalate and the like together, and feeds the molten resin 8 to the extrusion die head 7. The imaging camera 51 is disposed just under the extrusion opening 20 of the extrusion die head 7 to pick up the image of the end portion S of the molten resin 8 extruded from the extrusion opening 20. In a state where the molten resin 8 is hanging down from the extrusion opening 20, the end portion S is in agreement with the position of the extrusion opening 20 as shown in FIG. 5(A).

As described above, if the end portion S is within the normal region X as shown in FIG. 5(A), there is no need of operating the temperature-adjusting device 32. However, if the molten resin 8 is bent and the end portion S enters into the correction region Ya as shown in FIG. 6(A), the control means 34 recognizes the results (entering of the end portion S into the correction region Ya and the entering amount thereof) measured by picking up the image of the end portion S by using the imaging camera 51 and the binary processing means 52, and opens the opening/closing valve 39 in the external passage 41 connected to the cooling passage 36a provided on the side of the correction region Ye. The molten resin tends to bend toward the side of a lower temperature. Therefore, the cooling passage 36a is cooled so that the molten resin 8 that was bending toward the side of the correction region Ya now bends toward the side of the correction region Ye (the molten resin tends to bend toward the side of lower temperature) and that the end portion X of the molten resin 8 returns back to lie in the normal region X.

In this embodiment, it is desired to flow the air into the cooling passage 36a if the end portion S enters into the correction region Ya and does not return to the normal region X even after the passage of a predetrmined period of time. However, the air may be flown into the cooling passage 36a immediately after the end portion S has entered into the correction region Ya. In case the end portion S returns back to the normal region X within the predetermined period of time, the control means 34 does not have to operate the opening/closing valve 39.

This embodiment is so constituted as to open the opening/closing valve 39 if even one pixel of the pixels of the end portion S enters into the correction region Ya. However, there is no limitation on the number of the pixels, and the opening/closing valve 39 may be opened if, for example, not less than a predetermined number of pixels have entered.

As described above, if the air flows into the cooling passage 36a, the temperature of the die head decreases in the correction region Ye, and the molten resin 8 flowing through the extrusion passage 12 becomes partly cooler than the other portions. Therefore, the molten resin 8 bends toward the correction region Ye and returns back to enter into the normal region X.

The control means 34 closes the opening/closing valve 39 of the cooling passage 36a after the passage of a predetermined period of time from when the end portion S of the molten resin 8 has returned back to the normal region X. The timing for closing the opening/closing valve 39 may be immediately after the end portion S has returned back to the normal region X.

Further, if the end portion S has entered into the correction region Ye, first, and then into the correction region Yd as shown in FIG. 6(B), the control means 34 works to open the opening/closing valves 39 independently. Namely, the opening/closing valve 39 of the cooling passage 36e is opened after the passage of a predetermined period of time from when the end portion S has entered into the correction region Ye and, thereafter, the opening/closing valve 39 of the cooling passage 36d is opened after the passage of a predetermined period of time from when the end portion S has entered into the correction region Yd to flow the air into the cooling passages 36d and 36e independently from each other. Further, after the passage of a predetermined period of time from when the end portion S has returned back to the normal region X, the opening/closing valves 39 are operated independently from each other to no longer flow the air into the cooling passages 36d and 36e.

According to this embodiment as described above, when it is judged by the control means 34 that the end portion S has entered into the correction region Y, the air is flown in an independent manner into the cooling passages 36 positioned on the side opposite to the correction region Y to where the end portion S has entered. Therefore, bending of the molten resin can be automatically and accurately corrected while the forming system 1 is in operation.

The molten resin 8 extruded from the extrusion opening 20 of the extrusion die head 7 and is in the state of being in the normal region X, is cut by the cutter 17 of the cutting/holding unit 14, and a molten resin mass after cut is held by the holding members 15 and 16. Next, when the cutting/holding unit 14 has moved to the resin feed position 21 (see FIG. 2) of the compression-forming apparatus 4, the holding members 15 and 16 feed the molten resin mass to the required portion 23 (center) of the forming metal mold 22. Next, the molten resin is compression-formed by the forming metal mold 22 to form a formed article such as a preform or a container.

As another control method of the embodiment, the amount of the cooling medium (gas or liquid) that flows through the cooling passages may be controlled depending upon the number of pixels of a segment of the end portion S that has entered into the correction region Y by utilizing the binary processed image of the end portion S.

If the end portion S has entered into, for example, the correction region Ya only as shown in FIG. 6(A), the control means 34 counts the number of pixels of the portion that has entered, increases the amount of the cooling medium flowing into the cooling passage 36a if there are many number of pixels of the end portion S that has entered into the correction region Ya, and decreases the amount of the cooling medium if there are small number of pixels.

Further, if the end portion S has entered into a plurality of correction regions Yd and Ye as shown in FIG. 6(B), the control means 34 counts the number of pixels of the portion that has entered into the correction regions Y, judges if the number of pixels of the end portion S that has entered into the correction region Ye is larger than the number of pixels of the end portion S that has entered into the correction region Yd, and causes the cooling medium to flow more into the cooling passage 36e than into the cooling passage 36d.

Upon adjusting the amount of the cooling medium by counting the number of pixels of a portion of the end portion S that has entered, it is allowed to efficiently and accurately correct the bending of the molten resin 8.

In a state shown in FIG. 6(C), the number of pixels is the same or nearly the same for the end portion S entering into the correction regions Yg and Yh. Therefore, the flow rates of the air flowing into the cooling passages 36g and 36h may be controlled to be the same to meet the correction regions Yg and Yh.

In the cases of FIGS. 6(A) and (B), further, it is also allowable, as a further control method of the embodiment, to control the amount of the cooling medium flowing into the cooling passages 36 depending on the number of pixels of a segment of the end portion S that is entering by using flow rate control valves capable of varying the flow rate of the air instead of using the opening/closing valves 39.

In the control method of the embodiment described above, it is, further, possible to correct the bending of the resin more accurately though the control becomes complex.

For example, the normal region X may be narrowed to become the same as the region (horizontal position) of the extrusion opening 20 and the air may be flown into the cooling passage at a position opposite to the direction in which the molten resin 8 is bent readily or after the passage of a predetermined period of time if the end portion S thereof has deflected out of the position hanging down from the extrusion opening 20, i.e., if the end portion S thereof has deflected out of the normal region X and has entered into the correction region Y.

Further, the normal region X may be squeezed to a center point of the extrusion opening 20, and the correction control may be executed if the center point of the end portion S of the molten resin 8 has deflected out of the normal region X (center point of the extrusion opening 20).

In the above embodiment as shown in FIG. 5(A), the normal region X was set on a circle in concentric with the center of the extrusion opening 20 of the extrusion die head 7. By taking into consideration the centrifugal force of the cutter 17 for cutting the molten resin 8 and the shape of the holding members 15, 16 that feed the molten resin 8 to the forming metal mold 22, however, the range of the normal region X may be deflected from the center of the extrusion opening 20 as shown in FIG. 5(B). Further, the shape of the normal region X is not limited to a true circle but may be any other shape such as an elliptic shape. Further, instead of directly taking a measurement, the measuring means 33 may indirectly take a measurement by picking up the reflected image by using the imaging camera 51 by disposing a reflector or the like under the extrusion opening 20 in the vertical direction thereof.

Figure 7:
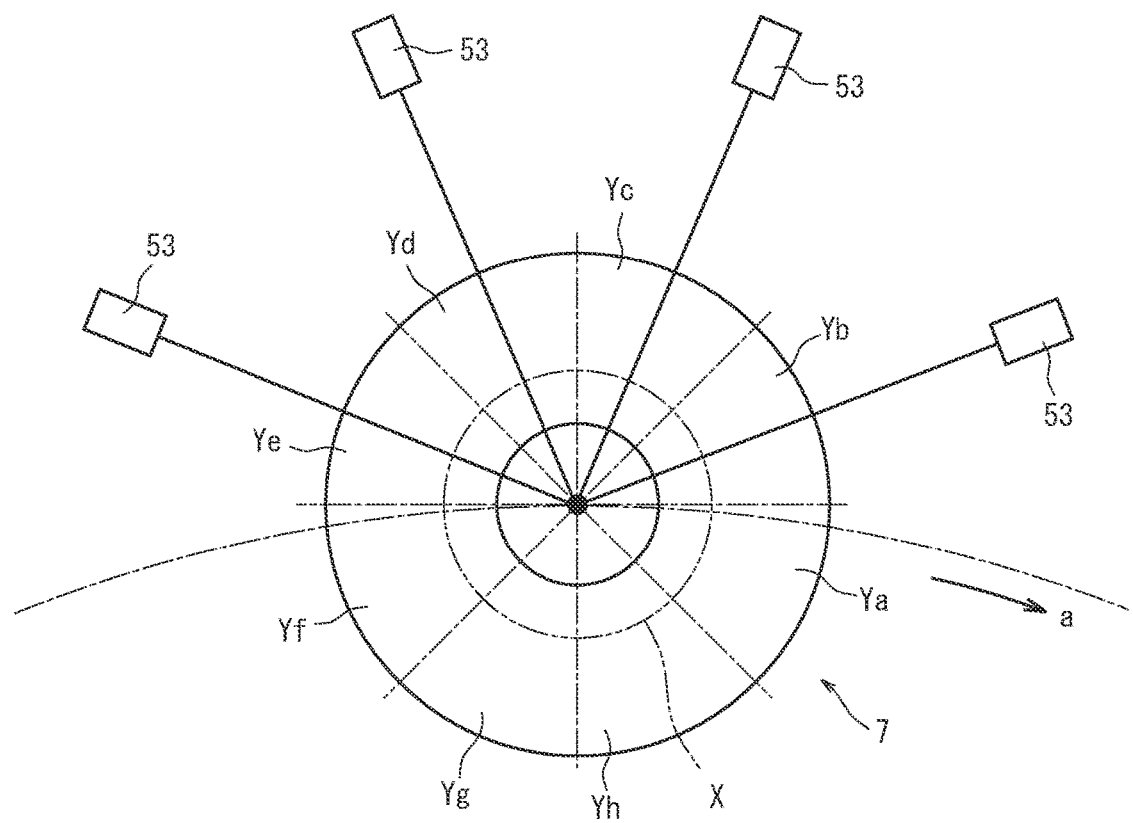
[FIG. 7] is a schematic view of a measuring means of the apparatus for correcting the bending of the molten resin according to a second embodiment of the present invention.

Next, a second embodiment of the invention will be described with reference to FIG. 7.

This embodiment uses laser displacement sensors 53 to substitute for the measuring means 33 (imaging camera 51 and binary processing means 52) that was used in the first embodiment.

The laser displacement sensors 53 are for measuring the distances to the molten resin 8, and four sensors are used here. The laser displacement sensors 53 are arranged at positions on the outer side of the track along which the cutting/holding units 14 travel so will not to interfere with the cutting/holding units 14 (see FIG. 2) or so that the laser beams thereof will not interfere with the cutting-holding units 14. The four laser displacement sensors 53 are arranged maintaining an angle of 45 degrees, and the laser beams are facing the center of the extrusion opening 20 and the outer circumferential end side of the molten resin 8 of when it is extruded from the extrusion opening 20. The control means 34 determines by calculation the position of the outer circumferential end side of the molten resin 8 based on the values measured by the laser displacement sensors 53. The eight cooling passages 36 of the temperature-adjusting device 32 are controlled in the same manner as in the above first embodiment.

The laser displacement sensors 53 measure the distances between the end of the outer circumferential surface of the molten resin 8 and the laser displacement sensors 53. The control means 34 determines the position of the end of the outer circumferential surface of the molten resin 8 from the values measured by the laser displacement sensors 53 and if the end of the molten resin has entered into the correction region Y, corrects the position of the end of the molten resin by flowing the air into the cooling passage on the side opposite to the side on where the molten resin 8 has entered into the correction region Y.

Embodiments of the invention were described above in detail with reference to the accompanying drawings. It should, however, be noted that the invention is not limited to the above embodiments only but can also be applied to an embodiment which compression-forms into a container a polyolefin such as polypropylene or polyethylene or a synthetic resin material of a molten state using a gas-barrier resin such as ethylene-vinyl alcohol as an intermediate layer, to an embodiment which arbitrarily bends the direction in which the molten resin is extruded from an extruder, or to any other embodiment without departing the scope of the present invention.

DESCRIPTION OF REFERENCE NUMERALS 1 forming system
2 extruder
3 synthetic resin feeder
7 extrusion die head
8 molten resin
20 extrusion opening
31 bend correcting apparatus
32 temperature-adjusting device
33 measuring means
34 control means 36 (36a to 36h) cooling passages
39 opening/closing valves
51 imaging camera
52 binary processing means
53 laser displacement sensors
S end portion
X normal region
Y (Ya to Yh) correction regions

The invention claimed is:

1. An apparatus for correcting the bending of a molten resin comprising a plurality of cooling passages arranged surrounding a molten resin extrusion passage of an extrusion die head along the direction of extrusion, a measuring means for measuring the horizontal position of the molten resin extruded from an extrusion opening of said extrusion passage, and a control means for controlling said cooling passages based on the results measured by said measuring means, wherein said measuring means includes an imaging means for picking up the image of an end portion of said molten resin, and a binary processing means for distinguishing a normal region of the end portion of the molten resin in the horizontal direction picked up by the imaging means from a correction region arranged outside the normal region, and said plurality of cooling passages are independently controlled by said control means, and said control means allowing a cooling medium to flow into the cooling passages of the extrusion die head positioned on a side opposite the bending direction of the molten resin when the end portion of the molten resin enters the correction region, and wherein said control means controls a flow of the cooling medium into the cooling passages of the extrusion die head depending upon a number of pixels of the correction region that the end portion has entered into and which has been counted utilizing a binary processed image of the end portion inputted from the binary processing means.

2. An apparatus for correcting the bending of a molten resin comprising a plurality of cooling passages arranged surrounding a molten resin extrusion passage of an extrusion die head along the direction of extrusion, a measuring means for measuring the horizontal position of the molten resin extruded from an extrusion opening of said extrusion passage, and a control means for controlling said cooling passages based on the results measured by said measuring means, wherein said measuring means includes an imaging means for picking up the image of an end portion of said molten resin, and a binary processing means for distinguishing a normal region of the end portion of the molten resin in the horizontal direction picked up by the imaging means from a correction region arranged outside the normal region, the correction region is divided to correspond to the arrangement of the plurality of the cooling passages, and said plurality of cooling passages are independently controlled by said control means, wherein said control means allowing a cooling medium to flow into the cooling passages of the extrusion die head positioned on a side opposite the bending direction of the molten resin when the end portion of the molten resin enters the correction region.

3. The apparatus for correcting the bending of the molten resin according to claim 2, wherein said molten resin is cut by a cutting mechanism and is used as a molten resin mass of a predetermined amount for being compression-formed.

4. An apparatus for correcting the bending of a molten resin comprising a plurality of cooling passages arranged surrounding a molten resin extrusion passage of an extrusion die head along the direction of extrusion, a measuring means for measuring the horizontal position of the molten resin extruded from an extrusion opening of said extrusion passage, and a control means for controlling said cooling passages based on the results measured by said measuring means, wherein said measuring means includes an imaging means for picking up the image of an end portion of said molten resin, and a binary processing means for distinguishing a normal region of the end portion of the molten resin in the horizontal direction picked up by the imaging means from a correction region arranged outside the normal region, the normal region is set on a circle that is concentric with a center of the extrusion opening of the extrusion die head, and said plurality of cooling passages are independently controlled by said control means, wherein said control means allow a cooling medium to flow into the cooling passages of the extrusion die head positioned on a side opposite the bending direction of the molten resin when the end portion of the molten resin enters the correction region.

* * * * *